United States Patent
Schellekens

(10) Patent No.: US 12,311,868 B2
(45) Date of Patent: *May 27, 2025

(54) FRONT END PANEL ASSEMBLY FOR AN ELECTRIC VEHICLE

(71) Applicant: SABIC GLOBAL TECHNOLOGIES B.V., Bergen op Zoom (NL)

(72) Inventor: Geert Jan Schellekens, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,330

(22) Filed: Mar. 11, 2024

(65) Prior Publication Data
US 2024/0208454 A1 Jun. 27, 2024

Related U.S. Application Data

(63) Continuation of application No. 17/970,319, filed on Oct. 20, 2022, now Pat. No. 11,958,433, which is a (Continued)

(30) Foreign Application Priority Data

Jan. 26, 2018 (EP) .................................... 18153567

(51) Int. Cl.
*B60R 21/34* (2011.01)
*B60J 1/02* (2006.01)
(Continued)

(52) U.S. Cl.
CPC .............. *B60R 21/34* (2013.01); *B60R 19/02* (2013.01); *B62D 25/105* (2013.01);
(Continued)

(58) Field of Classification Search
CPC ................................ B60Q 1/0017; B60Q 1/04
(Continued)

(56) References Cited

U.S. PATENT DOCUMENTS 5,115,878 A 5/1992 Hayata
6,793,275 B1 * 9/2004 Chernoff ................ B62D 25/16
296/193.11
(Continued)

FOREIGN PATENT DOCUMENTS

DE        2129049 A1 * 12/1972
DE    102015009992    2/2016
(Continued)

OTHER PUBLICATIONS

Translation of DE2129049 (Year: 1972).*
(Continued)

*Primary Examiner* — Amy R Weisberg
*Assistant Examiner* — Veronica M Shull
(74) *Attorney, Agent, or Firm* — CANTOR COLBURN LLP

(57) ABSTRACT

The invention relates to a front end panel assembly for an electric vehicle, the assembly comprising a front cover having side edges, the front cover extending in a bended shape such that a first angle α is enclosed between a first portion and a second portion of the front cover; and a carrier structure comprising a base and a peripheral wall extending from the base, wherein the carrier structure comprises a first part and a second part that enclose a second angle β; wherein the upstanding wall connects to the front cover at or near at least part of the side edges of the front cover, such that a space is formed and enclosed between the front cover and the carrier structure, wherein the first portion of the front cover covers the first part of the carrier structure, and the second portion of the front cover covers the second part of
(Continued)

the carrier structure. The invention also relates to a vehicle provided with such a front end panel assembly.

16 Claims, 3 Drawing Sheets

Related U.S. Application Data continuation of application No. 16/964,757, filed as application No. PCT/EP2019/051979 on Jan. 28, 2019, now Pat. No. 11,498,515.

(51) Int. Cl.
  *B60Q 1/04* (2006.01)
  *B60R 19/02* (2006.01)
  *B62D 25/10* (2006.01)
  *B62D 29/04* (2006.01)

(52) U.S. Cl.
  CPC ............... *B62D 29/043* (2013.01); *B60J 1/02* (2013.01); *B60Q 1/04* (2013.01); *B60R 2021/343* (2013.01)

(58) Field of Classification Search
  USPC ........................................ 296/187.09, 193.11
  See application file for complete search history.

(56) References Cited

U.S. PATENT DOCUMENTS

| | | | |
|---|---|---|---|
| 6,846,038 B1 | 1/2005 | White et al. | |
| 7,225,542 B2 * | 6/2007 | Chernoff | B62D 25/105 |
| | | | 29/897 |
| 7,810,877 B2 * | 10/2010 | Ishitobi | B60R 21/34 |
| | | | 296/193.11 |
| 7,997,642 B2 | 8/2011 | Rocheblave et al. | |
| 8,016,347 B2 * | 9/2011 | Uchino | B60R 21/34 |
| | | | 296/193.11 |
| 8,052,198 B2 | 11/2011 | Seksaria et al. | |
| 8,276,975 B2 | 10/2012 | Kimoto et al. | |
| 8,356,857 B2 | 1/2013 | Ralston et al. | |
| 8,517,421 B2 * | 8/2013 | Zhang | B60R 19/02 |
| | | | 293/131 |
| 9,248,866 B2 * | 2/2016 | Hammer | B60R 21/34 |
| 10,155,546 B2 * | 12/2018 | Kashima | B62D 25/12 |
| 10,160,418 B2 * | 12/2018 | Onishi | B60R 19/18 |
| 10,195,999 B1 * | 2/2019 | Glickman | B62D 25/085 |
| 10,246,044 B2 * | 4/2019 | Barbat | B60R 21/36 |
| 10,259,422 B2 * | 4/2019 | Nakasako | B62D 25/105 |
| 10,309,610 B2 | 6/2019 | Glickman et al. | |
| 2009/0195031 A1 | 8/2009 | Ishitobi | |
| 2015/0054305 A1 * | 2/2015 | Steinhilb | B60R 21/34 |
| | | | 296/187.04 |
| 2020/0101913 A1 * | 4/2020 | Rangel | B60R 19/02 |

FOREIGN PATENT DOCUMENTS

| | | | | |
|---|---|---|---|---|
| DE | 102015009992 A1 | | 2/2016 | |
| EP | 1908667 A1 * | | 4/2008 | ........... B62D 25/105 |
| EP | 2305540 A1 | | 4/2011 | |
| FR | 2852569 A1 | | 9/2004 | |
| JP | 10157467 A | | 6/1999 | |
| WO | 2013153335 A1 | | 10/2013 | |
| WO | 2019145528 A1 | | 8/2019 | |
| WO | 2019150639 A1 | | 8/2019 | |

OTHER PUBLICATIONS

International Search Report and Written Opinion; International Application No. PCT/EP2019/051979; International Filing Date—Jan. 28, 2019; Date of Mailing—Feb. 28, 2019; 11 pages.

* cited by examiner

FRONT END PANEL ASSEMBLY FOR AN ELECTRIC VEHICLE

CROSS REFERENCE TO RELATED APPLICATIONS

This application is a Continuation of application Ser. No. 17/970,319 filed on Oct. 20, 2022, which is a continuation of application Ser. No. 16/964,757 filed on Jul. 24, 2020, which claims priority to International Application No. PCT/EP2019/051979 filed on Jan. 28, 2019, and EP Application No. 18153567.5 filed on Jan. 26, 2018, the content of each of which is incorporated by reference in its entirety, and this application claims all the benefits accruing from these prior filed applications under, inter alia, 35 U.S.C. § 119, 35 U.S.C. § 120 and 35 U.S.C. § 371.

BACKGROUND OF THE INVENTION

Field of the Invention

The present invention relates to a front end panel assembly for an electric vehicle, comprising a front cover and a carrier structure. Furthermore, the invention relates to a vehicle comprising such a front end panel assembly.

Description of the Related Art

Transforming the automotive industry from fuel driven or hybrid cars to electricity driven cars has numerous consequences for engine design, but also for the exterior design of a car, a motor vehicle, in particular for the front fascia.

The front fascia of a vehicle, in particular a car, comprises a grille or a grating forming a barrier or a screen, which principal function is to admit cooling air to the car's radiator. However, it also takes a prominent place in attracting buyers for a car. The grille is often a distinctive style element and many OEMs use it as their primary brand identifier.

With the introduction of electric vehicles, the principal function of allowing cool air to the radiator is no longer. This opens up new design possibilities where the grille can be replaced by a closed component.

The new design possibilities also include the option to integrate one or more functions in a front panel, such as energy absorbing upon impact, electronics, and lighting features.

BRIEF SUMMARY OF THE INVENTION

According to the invention, there is provided a front end panel assembly for an electric vehicle, the assembly comprising:
- a front cover having side edges, the front cover extending in a bended shape such that a first angle, different from 0 or 180 degrees, is enclosed between a first portion and a second portion of the front cover; and
- a carrier structure comprising a base and a peripheral wall extending from the base, wherein the base comprises a first part and a second part that enclose a second angle different from 0 or 180 degrees;

wherein the upstanding wall connects to the front cover at or near at least part of the side edges of the front cover, such that a space is formed and enclosed between the front cover and the carrier structure, wherein the first portion of the front cover covers the first part of the carrier structure, and the second portion of the front cover covers the second part of the carrier structure.

The assembly forms a closed space or box that has a bending shape, i.e. a first section of the assembly and a second section of the assembly enclose an angle different from 0 or 180 degrees. The front cover and the base of the carrier structure are spaced apart by the peripheral wall of the carrier structure. The upstanding wall of the carrier structure connects to the front cover at or near the peripheral side edge of the front cover, such that the assembly forms a closed unit. The first angle enclosed between the first and second portions of the front cover and the second angle may be the same, or different. The base of the carrier structure and the front cover may run parallel or in a converging or diverging way, depending on a continuous or varying height of the upstanding wall and the first and second angles of their respective bend.

Where the first section of the front panel assembly may form a part of a front fascia and may include typical functions for a front fascia, such as lighting and other electronic functions, the second section of the front panel assembly may be used for energy absorbing functionalities. Pedestrian impact safety is an important topic within the automotive industry. In June 2014, the EURONCAP published a procedure to perform headform to bonnet leading edge tests to assess the pedestrian safety of a car upon impact with a pedestrian. Data on accidents has showed that the bonnet leading edge is responsible for a high portion of severe injuries of vulnerable road users (e.g. pedestrians), for instance for persons of smaller stature, such as children. Especially when the bonnet leading edge reference line is located in the area between the wrap around distance (WAD) of 1000 mm (forward limitation of the child headform test zone) and of WAD 930 mm (location of the upper load cell of the upper legform impactor, the upper limitation of the new upper leg test), an area which by definition is untested.

Usually, the area between a WAD of 1000 mm and 930 mm is assumed uncritical when no hard structures of injury causing vehicle components are located under the surface. However, if hard structures are located in this untested area, the area should be regarded being critical in terms of the pedestrian protection.

Therefore, according to an embodiment, an energy-absorbing component is provided on the second part of the carrier structure for absorbing energy upon impact. The energy-absorbing component may be formed integrally, i.e. as a single unit, with the second part of the carrier structure. Alternatively, energy-absorbing component can be attached to the carrier structure at a later stage in the assembly. The energy-absorbing component may extend at least between a WAD of 930 to 1000 mm, preferably extend beyond these distances, such as from a WAD of 850 to 1100 mm. The energy-absorbing component may comprise one or more of reversed U-shaped lobes that extend from the base of the second part of the carrier structure. These U-shaped lobes are designed to deform under impact upon collision with a pedestrian such that the impact energy is absorbed by the front panel assembly and pedestrian injuries may be limited. Additionally, or alternatively, the energy-absorbing component may comprise a foamed structure filling up at least part of the space enclosed between the second part of the carrier structure and the second portion of the front cover. The foamed structure is designed to deform and thus absorb the impact energy upon collision with a pedestrian. It is preferred that the foamed structure fills up the space between the carrier structure and the front cover in the second section of the front panel assembly. It is preferred that the foamed structure fills up the entire space enclosed between the second part of the carrier structure and the second portion of the front cover.

The foamed structure may be formed separately from the front panel assembly or components thereof, and later added to the front panel assembly. Alternatively, the foamed structure can be provided by injecting a foamed resin into the space between the carrier structure and the front cover.

The front cover may comprise an opaque 3D shaped sheet. The front cover has a bended shape, and can additionally be provided with 3D features, such as a protrusion, e.g. a ridge, and/or an indentation, to give the front cover a specific style. These 3D features may also have a technical function, such as the accommodation or attachment of other vehicle components. The front cover itself may be made of an opaque material, but can also be made opaque by painting or by molding-in-color of a translucent material.

Moreover, the front cover may comprise at least one translucent portion. Such a translucent portion may be used to integrate lighting, functional and/or ornamental, into the front panel assembly. Preferably, the translucent portion is provided in the first portion of the front cover. This translucent portion may also be transparent. Translucency is a superset of transparency. A translucent medium allows the transport of light while a transparent medium not only allows the transport of light but also allows for image formation. As such, a transparent medium is also translucent, but a translucent medium can be transparent, but is not necessarily so. Opacity is the opposite of translucency. The translucent portion may have a transmittance of visible light above 10%. Opaque is defined as having a visible light transmittance of up to 10%. The transparent portion is optically transparent, i.e. it is transparent to at least light visible to the human eye, and may have a transmittance of visible light above 30%.

The assembly may further comprise a light module enclosed within the space formed between the first portion of the front cover and the first part of the carrier structure. The translucent or transparent portion in the first portion of the front cover may form part of the light module, such as an LED light module. The light module may comprise a reflector and a lighting member. The reflector may be provided at the first part of the carrier structure, for instance embedded in a groove-shaped indent. The lighting member may be placed between the reflector and the front cover. According to an embodiment, the assembly further comprises a light module enclosed within the space formed between the front cover and the carrier structure. The light module may be provided as a lighting pattern or lighting sculpture within the space between the front cover and the carrier structure.

The assembly may further comprise a receiving portion for an electronic component for integration with the assembly. Preferably, the receiving portion extends to the front cover and is at least partially enclosed by the carrier structure. The receiving portion may receive any type of electronic component, including a LiDAR module for anticipated self-driving cars. The front end panel assembly would be highly suitable for integrating such components.

The receiving portion may be provided in the first portion of the front cover and is at least partially enclosed by the first part of the carrier structure.

The assembly may comprise a thermoplastic material. The front cover and/or the carrier structure may be manufactured from a thermoplastic material, for instance with injection molding or thermoforming.

The thermoplastic material may be a polyolefin such as PE or PP; polybutylene terephthalate (PBT); acrylonitrile-butadiene-styrene (ABS); acrylic-styrene-acrylonitrile (ASA); polycarbonate (PC); polycarbonate/PET blends; polycarbonate/PBT blends; polycarbonate/ABS blends; polycarbonate/ASA blends; copolycarbonate-polyesters; acrylonitrile-(ethylene-polypropylene diamine modified)-styrene (AES); phenylene ether resins (PPO); PPO/PS blends; blends of polyphenylene ether/polyamide; polyamides; phenylene sulfide resins; polyvinyl chloride (PVC); high impact polystyrene (HIPS); low/high density polyethylene (L/HDPE); polypropylene (PP); expanded polypropylene (EPP); poly(methyl methacrylate); and thermoplastic olefins (TPO). The polymers or thermoplastic materials may be linear polymers or branched polymers or combinations thereof. The plastic can optionally be reinforced, e.g., with fibers, particles, flakes, as well as combinations comprising at least one of the foregoing, such as especially for example long glass fibers, short glass fibers, glass beads, talc, mica, inorganic fillers, natural fibers, conductive fillers and/or carbon fibers. For example, the thermoplastic second component can be formed from STAMAX® materials, a long glass fiber reinforced polypropylene commercially available from SABIC.

Preferably, the front cover and the carrier structure are made of a polypropylene compound or a co-polymer thereof. Preferred alternatives can include PPO/PS blends (NORYL™ from SABIC) and polycarbonate/PET blends or polycarbonate/PBT blends (XENOY™ from SABIC). The translucent portion of the front cover may comprise a translucent PP compound, such as QRYSTAL™ by SABIC, a polycarbonate or a PMMA. At least part of the front cover may be provided with a protective layer. The protective layer may comprise a scratch resistance layer and/or UV resistant layer, or any protective layer that would render the front cover suitable for environmental exposure, especially for PC.

The front cover may be a flat panel, or may have a slight curvature, i.e. have a convex shape, for instance to have a smooth transition and/or to be flush with the further components of the front fascia of a vehicle.

The invention also relates to an electric vehicle comprising a front end panel assembly as described above. The front end panel assembly may form part of a front fascia of the vehicle, where fascia is a general term for a set of front-end components of the vehicle. The first section of the front end panel assembly may be part of the front fascia of the vehicle, as the first section may replace the grille of the vehicle. A pair of headlights may flank the assembly. The front end panel assembly may thus be placed between the headlights of the vehicle. The front panel assembly may extend between a bumper fascia and a front window of the vehicle. The first section of the front end panel assembly may be adjacent to the bumper fascia, e.g. a covering of the bumper beam, and the front end panel may further extend over the front of the vehicle up to a lower edge of the front window of the vehicle, such that the second section of the front end panel assembly may form a replacement for a vehicle hood. Alternatively, the second section of the front end panel assembly may border on an edge of a front hood of the vehicle.

BRIEF DESCRIPTION OF THE DRAWINGS

The features and advantages of the invention will be further appreciated upon reference to the following drawings of a number of exemplary embodiments, in which.

DESCRIPTION OF ILLUSTRATIVE EMBODIMENTS

Figure 1:
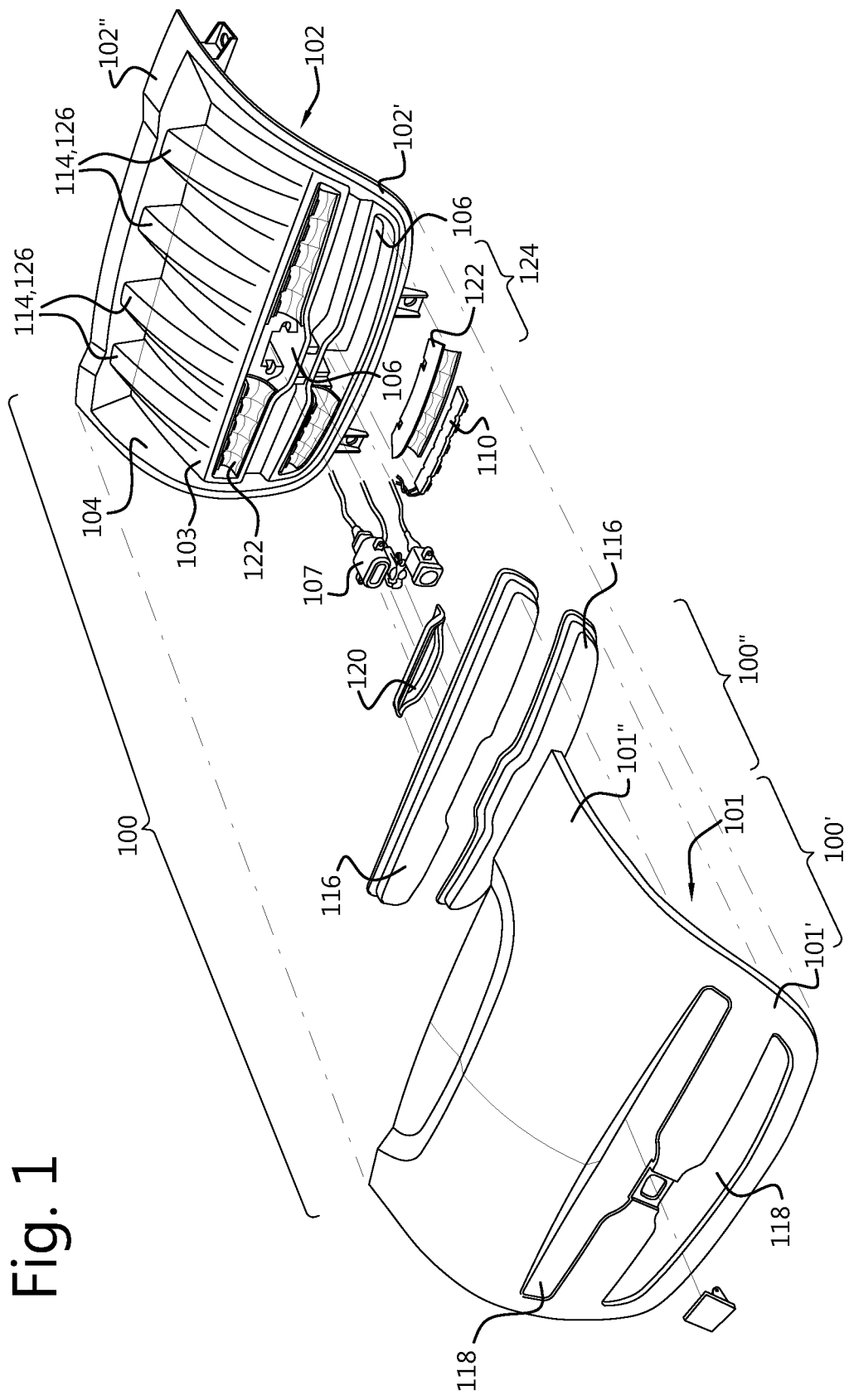
FIG. 1 shows a front end panel assembly according to a first embodiment of the present invention in exploded view.
Figure 2:
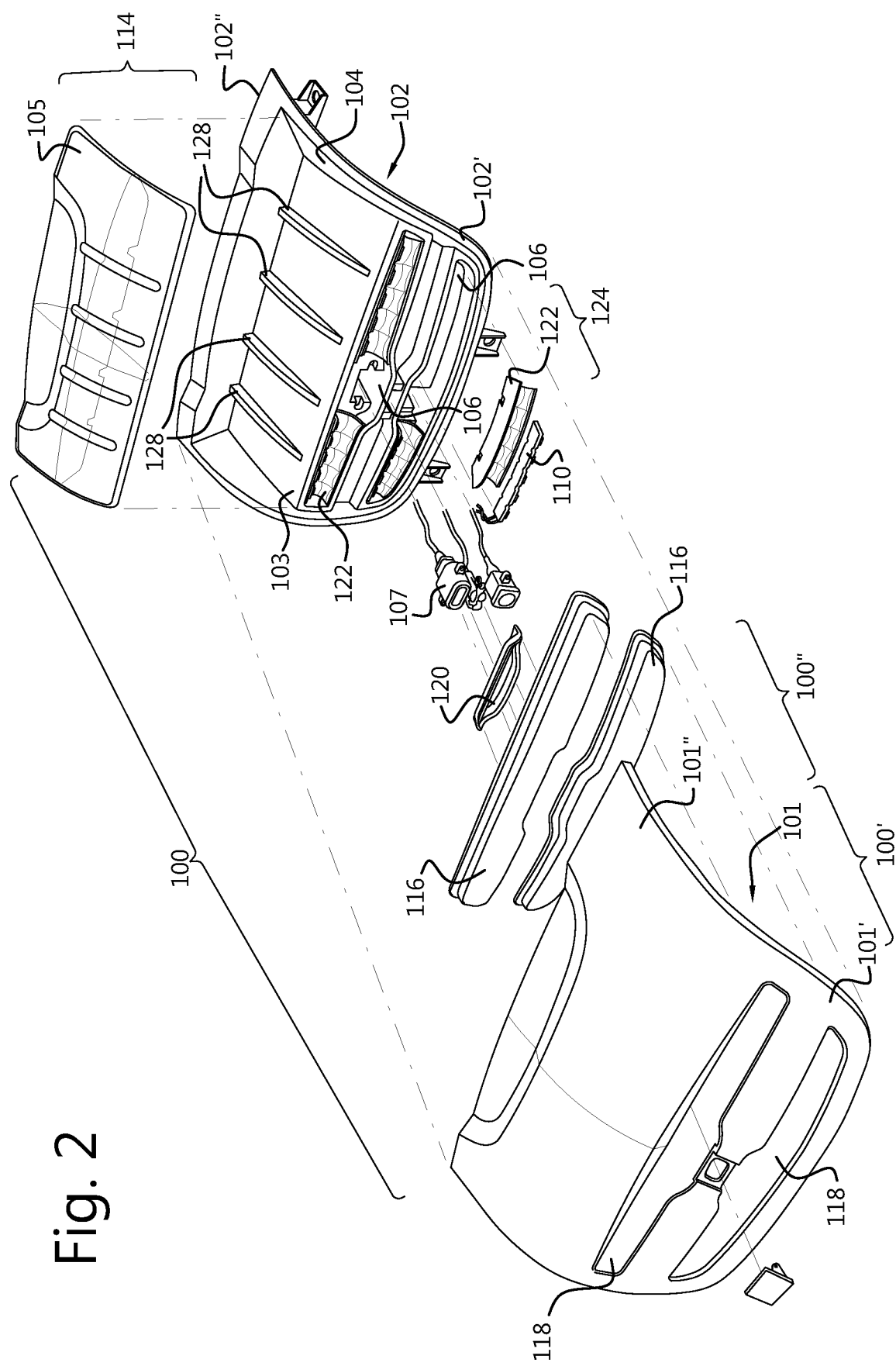
FIG. 2 shows a front end panel assembly according to a second embodiment of the present invention in exploded view.

FIG. 1 shows a front end panel assembly 100 according to a first embodiment of the present invention in exploded view, and FIG. 2 shows a front end panel assembly according to a second embodiment of the present invention in exploded view.

Viewed from the front cover 101, a carrier structure 102 is provided behind the front cover 101. The carrier structure 102 comprises a base 103 and a peripheral wall 104 that extends from the base 103 and connects with the front cover 101 at or near its side edges. The peripheral upstanding wall 104 spaces the base 103 from the front cover 101. The front cover 101 and the carrier structure 102 together enclose a space.

The front end panel assembly 100 has a bent shape. To achieve such a bent shape, the base 103 of the carrier structure 102 is bent, thus shaping the carrier structure 102 in a bend. The front cover 101 also has a bent shape.

The carrier structure 102 has a first portion 102' and a second portion 102" and the front cover has a first part 101' and a second part 101". Between each first and second part or portion, an angle α, β is enclosed, wherein the angles α, β are greater than 0 degrees and smaller than 180 degrees. The angles α and β May be similar, but can also differ. The peripheral wall 104 of the carrier structure 102 that attaches to the front cover 101 (not shown) may accommodate the difference in angles α, β.

The first part of the front cover 101' and the first portion of the carrier structure 102' together form a first section of the front end panel assembly 100'. The second part of the front cover 101" and the second portion of the carrier structure 102" form a second section of the front end panel assembly 100".

The first portion 102' of the carrier structure 102 comprises multiple receiving portions 106 to receive an electronic component 107, such as a sensor or a LiDAR component, or a light module 124. The receiving portion 106 is provided within the base 103 and opens out to the front cover 101. The light module 124 comprises a reflecting member 122, such as a V-shaped reflector, and a lighting device 110, such as an LED strip, that is placed close to or within the reflector.

The first part 101' of the front cover 101 comprises multiple openings 118 to accommodate translucent portions 116 and transparent portion 120. The translucent portions 116 are aligned with the light modules 124 in the receiving portions of the first portion 102, such that when the light modules 124 are in use, i.e. the lighting device is turned on, light will be transmitted through the translucent portions 116. The transparent portion 120 is aligned with the receiving portion for the electronic component. Especially when this electronic component comprises a sensor (parking sensor, moving sensor, or the like) and/or a LiDAR device, the transparency of the front cover 101 at that location is of importance for the high transmittance of electro-magnetic radiation.

The second section 100" of the front end panel assembly 100 comprises an energy-absorbing component 114 to absorb impact energy upon a collision with a pedestrian, or vulnerable road user, such as upon head impact. The embodiment of FIG. 1 shows such an energy-absorbing component 114 comprising multiple lobes 126 extending from the base 103 of the carrier structure 102. These lobes are designed to crush under the impact of the collision, thus absorbing the impact energy and limiting the damage to both the vehicle and the impacted object, in particular a pedestrian. The embodiment in FIG. 2 shows such an energy-absorbing component 114 comprising multiple ribs 128 that extend from the base 103 of the carrier structure 102. The ribs 128 are provided for increasing the stiffness of the base 103 at the second part 102" of the carrier structure 102. By providing a relatively stiff base 103, the foamed structure 105 is sufficiently supported by the base 103 and can thus absorb at least part of the impact energy upon collision.

In addition, the energy-absorbing component 114 comprises a foamed structure 105 that is provided between the ribs and the front cover 101. This foamed structure fills up the space between the front cover 101 and the carrier structure 102 enclosed in the second section 100" of the front end panel assembly.

Figure 3:
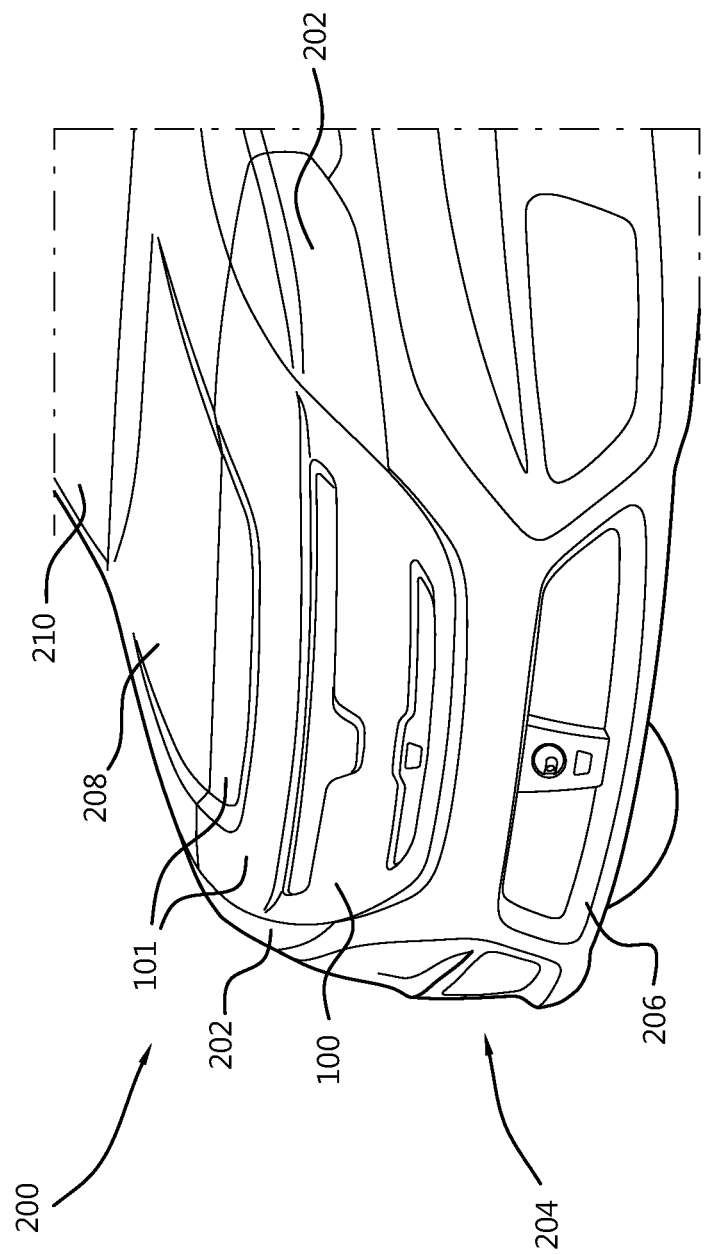
FIG. 3 shows a perspective view of a vehicle comprising a front end panel assembly according to the present invention.

FIG. 3 shows a perspective view of a vehicle 200 comprising a front end panel assembly 100 according to the present invention. The front end panel assembly 100 is provided as a component of a front fascia 204 of a vehicle 200. The front end panel assembly 100 comprises a front cover 101 (see also FIGS. 1 and 2) at its front. The front end panel assembly 100 is located between a pair of headlights 202 at its sides. At its top end, the hood 208 of the vehicle is located; at its bottom end a bumper assembly 206 of the vehicle is provided. Alternatively, the top end of the front end panel assembly 100 can extend towards the front window 210 of the vehicle.

LIST OF ITEMS

100. Front end panel assembly
100'. First section of front end panel assembly
100". Second section of frond end panel assembly
101. Front cover
101'. First part of the front cover
101". Second part of the front cover
102. Carrier structure
102'. First portion of the carrier structure
102". Second portion of the carrier structure
103. Base
104. Peripheral wall
105. Foamed structure
106. Receiving portion
107. Electronic component
108. Inner surface of base
110. Lighting device
112. Translucent portion
113. Transparent portion
114. Energy absorbing component
116. Translucent portion
118. Opening
120. Transparent portion
122. Reflector
124. Light module
126. Lobes 128. Ribs
200. Vehicle
202. Head light
204. Front fascia
206. Bumper assembly
208. Hood
210. Front window

We claim:

1. A front end panel assembly for an electric vehicle, comprising:
   a cover including:
   side edges; and
   front and aft portions disposed at a first angle to each other; and
   a carrier structure including:
   peripheral walls that extend upwardly to the side edges of the cover;
   a front portion that is covered by the front portion of the cover; and
   an aft portion that is covered by the aft portion of the cover,
   wherein the front and aft portions of the carrier structure are disposed at a second angle to each other that differs from the first angle, so that a space is defined between the cover and the carrier structure.

2. The assembly of claim 1, further comprising:
   an energy absorbing structure disposed in the space and extending between the aft portion of the carrier and the aft portion of the cover.

3. The assembly of claim 2, wherein the energy absorbing structure comprises:
   reversed U-shaped energy absorbing lobes formed onto the aft portion of the carrier structure and extending into the space toward the cover.

4. The assembly of claim 2, wherein the energy absorbing structure comprises:
   a foamed structure seated within the space at the aft portion of the carrier structure.

5. The assembly of claim 2, wherein the energy absorbing structure comprises:
   ribs, each of which extending upwardly from the aft portion of the carrier structure toward the cover.

6. The assembly of claim 1, wherein the cover comprises an opaque D shaped sheet.

7. The assembly of claim 1, wherein the cover comprises at least one translucent portion.

8. The assembly of claim 7, wherein the at least one translucent portion is provided in the front portion of the cover.

9. The assembly of claim 1, further comprising a light module enclosed within the space formed between the front portion of the cover and the front portion of the carrier structure.

10. The assembly of claim 1, comprising a thermoplastic material.

11. The assembly of claim 9, comprising a receiving portion for accommodating an electronic component and/or the light module for integration with the assembly.

12. The assembly of claim 11, wherein the receiving portion is provided in a first section of the front end panel assembly and is at least partially enclosed by the front portion of the carrier structure.

13. An electric vehicle comprising: the front end panel assembly of claim 1.

14. The vehicle of claim 13, wherein the front end panel assembly forms part of a front fascia of the vehicle.

15. The vehicle of claim 13, wherein the front end panel assembly is flanked by a pair of headlights.

16. A vehicle, comprising:
    a front fascia of a bumper assembly, the front fascia comprising the assembly of claim 1; and
    a hood that extends between the front fascia and a front window of the vehicle.

* * * * *